United States Patent

[11] 3,633,710

[72] Inventor Franz Preinfalk
 Lagenfeld, Germany
[21] Appl. No. 886,051
[22] Filed Dec. 17, 1969
[45] Patented Jan. 11, 1972
[73] Assignee August Thyssen-Hutte Aktiengesellschaft
[32] Priority Dec. 19, 1968
[33] Germany
[31] P 18 15 615.5

[54] RAIL BRAKE
 10 Claims, 7 Drawing Figs.
[52] U.S. Cl.................................................. 188/62,
 188/32
[51] Int. Cl.................................................. B61k 7/02
[50] Field of Search.......................................... 188/5, 32,
 62

[56] References Cited
UNITED STATES PATENTS
3,439,778   4/1969   Garbers et al. ............... 188/62

Primary Examiner—Duane A. Reger
Attorney—Burgess, Dinklage & Sprung

ABSTRACT: In a rail brake wherein a rubber rail section is brought into contact with the rolling wheel of a car, the rubber section is so profiled that it increases in thickness from the top to the bottom whereby as the weight of the wheel thereon increases a greater volume of the rubber is brought into play with each increasing increment of penetration of the rubber by the wheel.

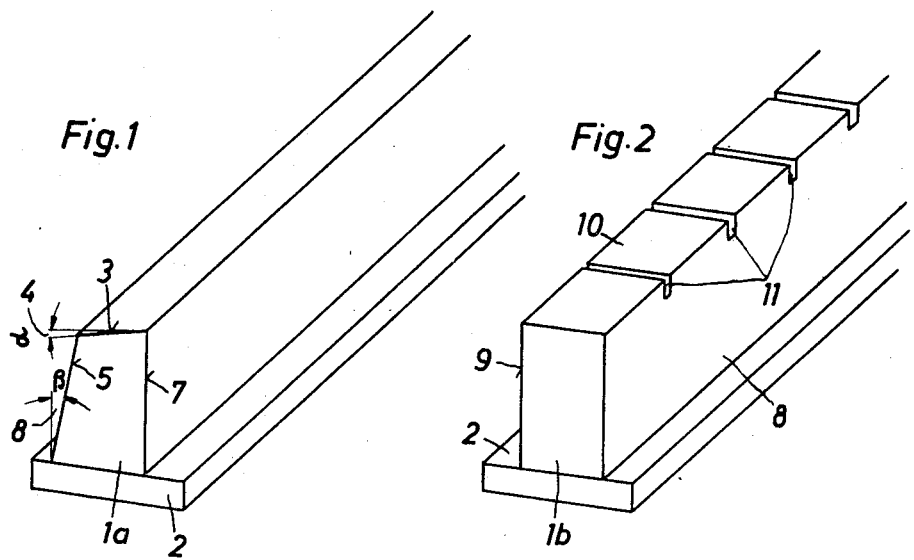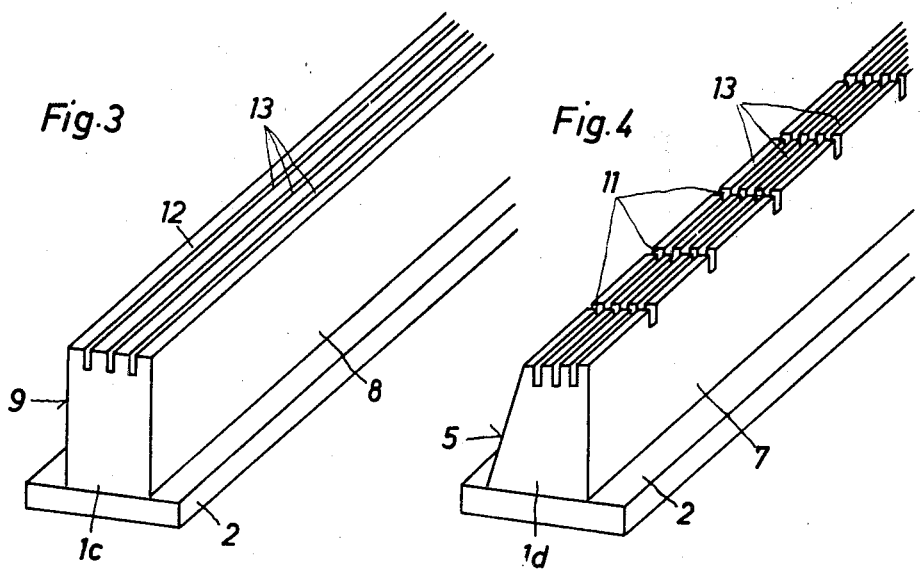

RAIL BRAKE

Rail brakes having at least one brake body made of rubber-elastic material mounted on a solid support and extending in the direction of the track are known. The brake body is constructed in the form of a rail and has on its top a running surface for the wheels to be braked, which runs in the direction of the main rail.

In these brakes at least one and preferably both rails of a track are replaced along a certain length with rubber rails which form the brake bodies. The rubber rails are fixedly disposed on a suitable support capable of bearing a load. They are variable in height and can be set into two different positions relative to the main section of track. In the braking position, the rubber rails are lifted, and in the nonbraking or freewheeling position, the rubber rails are lowered.

When the rubber rails are in the braking position, the treads of the wheels of an oncoming car roll on the rubber rails, which take on the entire weight of the car. Depending on the weight of the car, the wheels sink into the elastic rubber brake body to a greater or lesser depth, and the kinetic energy of the car is transformed at least partially into work—i.e., kneading the rubber, so that the car is retarded as it rolls over the rubber rails.

In the freewheeling position, the rubber rails are lowered to such an extent that the wheels of an oncoming car have no contact with the rubber rails. The flanges of the wheels roll on adjacent guiding rails which are provided alongside the rubber rails and consist of steel shapes. No braking, therefore, takes place when the rubber tracks are in the lowered position.

In brakes of this kind, the rubber rails consist of approximately square profiles with flat tops. In these brakes it has been found in practice that the braking action on light cars is slighter than it is on heavy cars. Assuming that the initial speeds are equal, therefore, a greater brake length is required for a light car than for a heavy car to produce a particular final speed. In order to effectively brake light cars, therefore, it has been found necessary to make the length of the brake much longer than is necessary for the braking of heavy cars. For space reasons this often leads to difficulties, and it is, of course, uneconomical.

THIS INVENTION

This invention is an improved rail brake of this type adapted to retard the motion of quite light cars while at the same time effectively retarding the motion of heavy cars.

According to this invention, in a rail brake having at least one braking body of rubberlike elastic material mounted on a solid support and extending in the direction of the track, which body is constructed as a rail section and has on its top a running surface for the wheels to be braked, which section is straight in the direction of the main rails; the cross section of the brake body increases from the running surface toward the support. In this manner an easier initial deformability of the brake body is achieved with respect to the area of the depth of penetration of light cars, while at the same time the rail brake can quite readily accommodate very heavy cars.

The cross-sectional increase in area of the brake body from the running surface to the support can, according to one embodiment of the invention, be brought about by tilting the running surface of the brake body slightly toward the outside of the track. It is also possible, however, to provide the running surface of the brake body with longitudinal grooves. In another embodiment, the running surface can be provided with notches running straight across or at an angle. It is especially advantageous to combine these features.

If the running surface of the brake body has a slight tilt toward the outside of the track, the tilt should preferably amount to 5° to 20°. Alternatively, the running surface can be rounded or crowned.

For the support of the easily deformable upper portion of the brake body it is desirable for the width of the brake body to increase from the running surface toward the foot. The side averted from the track can be inclined preferably 10° to 30° from the vertical.

To prevent the easily deformable portion of the brake body from being excessively deformed or even destroyed by the passage of a very heavy car, the difference in height between the running surface of the brake body and that of a laterally disposed guiding rail for the flange of the wheel is such, when the brake body is in the braking position, that when a heavy car is being braked the flange of the wheel remains in contact with the guiding rail. The guiding rail thus limits the depth of penetration of the wheels.

THE DRAWINGS

FIGS 1 to 4 show four different brake body designs, partly in cross section;

DISCUSSION

Figure 5:
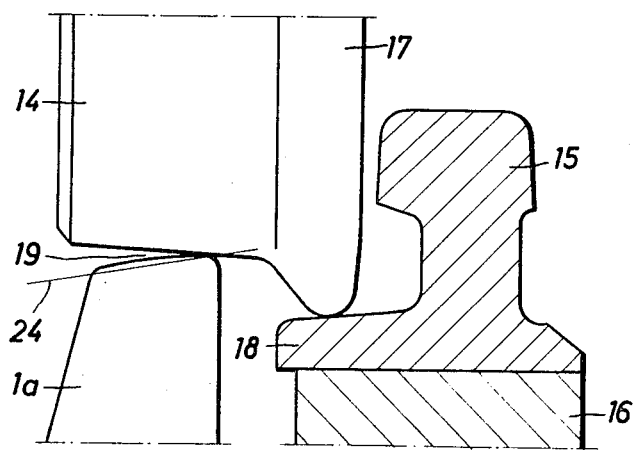
FIG. 5 is a section through a rail brake with an unretarded wheel running thereover.

Referring to FIG. 1, a brake body $1a$ consists of a rail of rubber which is vulcanized onto a flat steel bar 2. Alternatively, or in conjunction therewith, member 2 can be grooved or otherwise shaped to accommodate the rubber section. The running surface 3 forms with the horizontal line 4 an angle $\alpha$ amounting to between 5° and 20°. The lateral surface 5 forms with the perpendicular line 6 an angle $\beta$ amounting to about 10° to 30°. The other lateral surface 7 is practically perpendicular.

Side 7 faces the center of the track when the system is installed, i.e., it faces the flange of the wheel being braked.

In FIG. 2, a brake body $1b$ consists of rubber-elastic material and has an approximately rectangular profile. The running surface 10 is provided with a series of notches 11. The notches 11 are preferably at 90° to the longitudinal edge, though they can also be at a lower angle. The side surfaces 8 and 9 are substantially perpendicular.

In the case of the brake body $1c$ shown in FIG. 3, the side surfaces 8 and 9 are disposed perpendicularly. The running surface 12 is provided with a series of longitudinal grooves 13.

In the brake body $1d$ represented in FIG. 4, the profile is substantially the same as in FIG. 1, that is, the running surface $1d$ of the brake body has a slight slope and is also provided with longitudinal grooves 13 and cross notches 11. It resembles the tread of an auto tire.

In the rail brake represented in FIG. 5, the brake body $1a$ is in the lowered position. The profile of the brake body is substantially the same as in FIG. 1, although the running surface is slightly rounded, as indicated by the chord 24. The tread of wheel 14 has no contact with the brake body $1a$. Between the tread of the wheel 13 and the running surface of the brake body there is a gap 19. The wheel flange 17 rolls on the foot 18 of a guiding rail 15 disposed laterally, which is mounted on a support 16.

Figure 6:
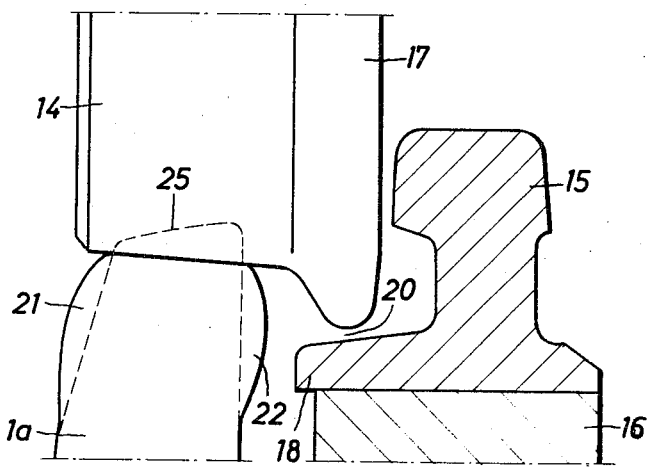
FIG. 6 shows a section through a rail brake when the wheel of a light car is being braked.

In FIG. 6 the brake body $1a$ is shown in the raised position relative to the guiding. The rail brake can be raised to establish contact, or the guiding rail can be lowered. The tread of the wheel 14 of a light car rolling on the running surface of the brake body $1b$ causes lateral bulges 21 and 22 to form. The wheel flange 17 is separated from the foot 18 of the guiding rail 15 by a gap 20. The entire weight of the car wheel thus bears upon the brake body $1a$.

Figure 7:
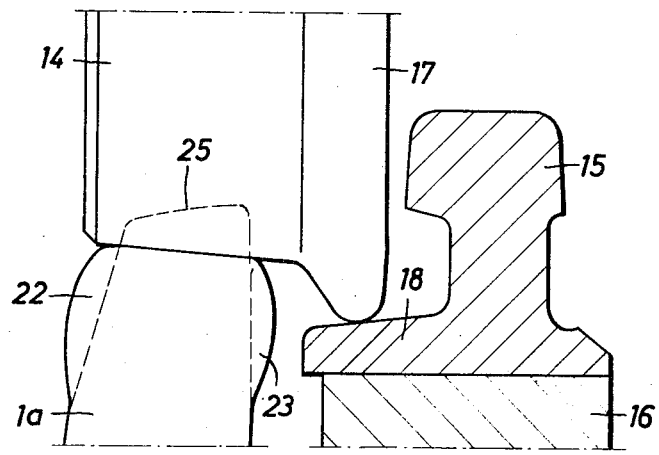
FIG. 7 shows a section through a rail brake that is braking a wheel of a heavy car.

In FIG. 7 the brake body $1a$ is represented in the same raised position as in FIG. 6. In this case, however, the braking of a heavier car is represented. The tread 14 of a wheel runs on the running surface of a brake body $1a$ and penetrates deeply into it. This produces great lateral bulges 22 and 23. At the same time the wheel flange 17 bears against the foot 18 of the guiding rail 15. The guiding rail thus receives, at a certain axle loading, a limited portion of the weight thereby limiting the depth of penetration and preventing an excessive deformation of the brake body. The undeformed profile of the brake body $1a$ is represented in FIGS. 6 and 7 by a broken line 25.

I claim:

1. In a rail brake comprising a brake body and a rigid support carrying said brake body, said brake body having a running surface extending in the direction of advance of a rolling wheel of a vehicle riding thereon whereby the advance of said wheel is retarded when said running surface is brought into contact with said wheel, the improvement which comprises using as said brake body running surface an elastic material profiled so as to increase in mass from the surface adjacent said wheel toward said rigid support.

2. The rail brake of claim 1 wherein said running surface has a slight slope toward the side away from the center of the track.

3. The rail brake of claim 1 wherein said running surface is provided with longitudinal grooves.

4. The rail brake of claim 1 wherein said running surface is provided with notches approximately perpendicular to the length thereof.

5. The rail brake of claim 2 wherein said slope is about 5° to 20°.

6. The rail brake of claim 1 wherein said running surface is slightly rounded.

7. The rail brake of claim 1 wherein the width of said brake body increases from said running surface toward said rigid support.

8. The rail brake of claim 7 wherein the side of said brake body away from the middle of the track is inclined 10° to 30° from the vertical.

9. The rail brake of claim 1 wherein the difference in height between said running surface and a laterally disposed guiding rail for the flange of said wheel being braked is such, in the braking position, with the wheel of a heavy car the wheel flange remains in contact with said guiding rail.

10. The rail brake of claim 1 wherein said running surface is provided with notches running at a lower angle than 90° to the length of the brake.

* * * * *